Figure 1:
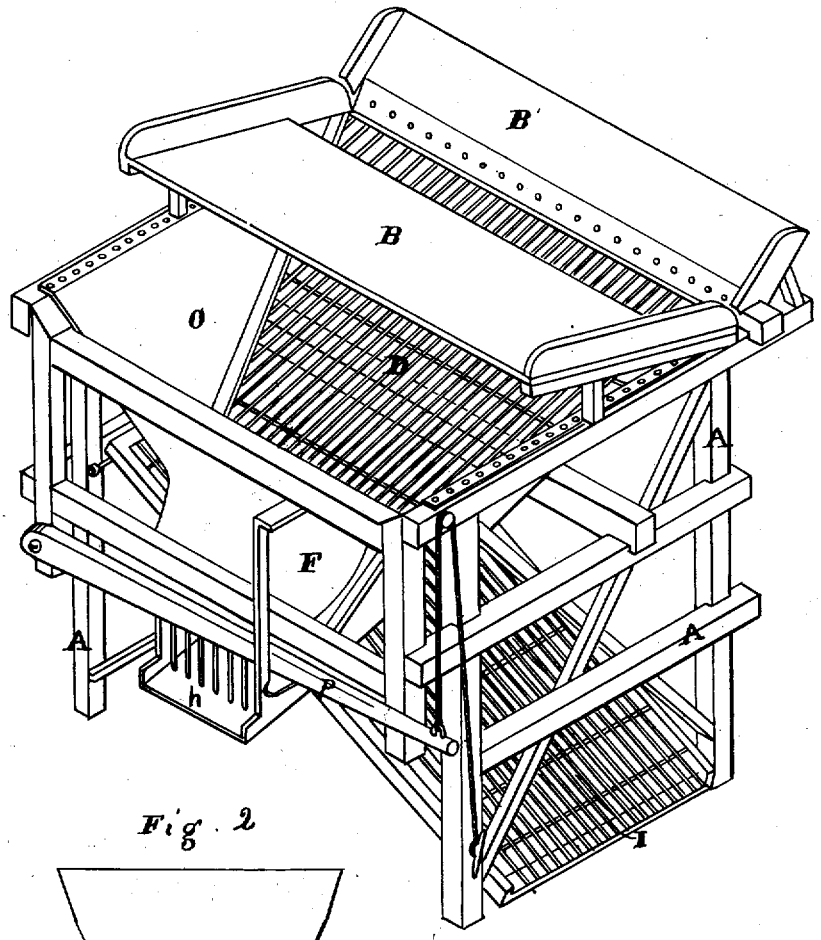
Figure 2:
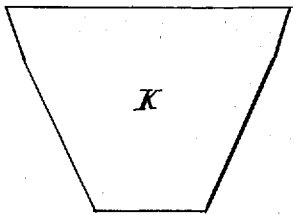

M. R. ROBERTS.

COAL-SCREENS AND CHUTES.

No. 7,341. Reissued Oct. 10, 1876.

Witnesses
Jno. L. Boone
Cha's G. Page,

Inventor.
Martin R. Roberts
by Dewey & Co
Attys

UNITED STATES PATENT OFFICE.

MARTIN R. ROBERTS, OF SAN FRANCISCO, CALIFORNIA.

IMPROVEMENT IN COAL SCREENS AND CHUTES.

Specification forming part of Letters Patent No. 140,077, dated June 17, 1873; reissue No. 6,211, dated January 5, 1875; reissue No. 7,341, dated October 10, 1876; application filed July 10, 1876.

*To all whom it may concern:*

Be it known that I, MARTIN R. ROBERTS, of the city and county of San Francisco, and State of California, have invented certain new and useful Improvements in a Combined Portable Hopper, Chute, and Screening Apparatus; and I do hereby declare the following description and accompanying drawings are sufficient to enable any person skilled in the art or science to which it most nearly appertains to make and use my said invention without further invention or experiment.

Previous to my invention, in unloading vessels of coal the coal has, for the most part, been hoisted from the hold over the bulwarks, and dumped upon the wharf or upon the coal previously dumped, or, if chutes were used, such chutes were fixed; nor, so far as I am aware, has a movable chute ever been known or used by which the coal could be received from the vessel at any point in the wharf, and be screened and delivered to the cart.

My invention consists of a portable apparatus for receiving coal from the bucket by which it is hoisted from the hold of a ship, and for screening and delivering it to carts on the wharf, said apparatus being adapted for ready removal from place to place, when required.

By this apparatus I am able to save repeated handlings and consequent expense, and the breakage of the coal, and the apparatus can be changed from one point to another where the vessel may be placed.

There are further and subordinate objects to be secured by my invention, and the improved details devised for these purposes will be set forth more fully hereafter.

In the drawings, A A represent a strong frame, which is properly stayed and braced, so as to withstand the concussions to which it will be subjected. At one side of the top of this frame I secure two boards, B B′, at an obtuse angle to each other, in the form of a trough, but leave their lower ends separated, so as to provide a space, C, between them, for the purpose hereinafter described. These boards form what I call the hopper. The board B′ forms an extension to one side, D, of a large reservoir, O, which is located in the body of the frame below the hopper. This side D of the large reservoir slopes toward the opposite side of the frame, and is constructed of parallel wires, secured at short distances apart, so as to form a screen over which the coal or other substance must pass in descending from the hopper to the reservoir, and through which the small particles up to a certain size will fall, leaving the larger pieces, which cannot pass through the screen, lying in the second or large hopper. The reservoir is contracted toward its lower end, and a chute, F, extends from it out over the opposite side of the frame from that on which the upper hopper is located. A gate, *h*, which will be more fully described hereafter, serves to retain the coal in the chute and reservoir until it is desired to allow it to pass from the chute into the cart or other vehicle. An independent grate or screen, I, of finer mesh than the grate D, is secured in an inclined position in the frame A A, below the screen D, so as to receive the particles of coal or other substance which pass through the upper screen, and which serves to again separate it into two grades. This screen stands at an angle transversely to the upper screen, so that the particles which pass down it, on account of not being small enough to pass through the meshes, will be carried off to one side of the machine, while the finer portions which pass through the screen will fall upon the floor or wharf directly under the frame. Two or more of these screens can be used, and the size of the meshes can be varied according to the substance to be cleaned and the number and quality of the grades into which it is desired to separate the substance being discharged.

The frame A A will be mounted upon small wheels, so that it can be moved from one place to another upon a wharf, in order to be placed in position to receive the discharging cargo of different ships; but when moving it from one wharf to another, I employ axles across each end of the frame, upon which strong wheels are placed, so that the entire machine can be drawn along similar to any vehicle.

The hopper B B′ is as long as the machine, and is made wide, so that when ordinary care is used in dumping it is certain to catch all the coal poured from the swinging tub. This hopper is also placed high on the machine, and but slightly above the inclined side of the reservoir, so that the coal has but a short distance to fall, and is thereby prevented from being broken and pulverized. The outlet of the hopper B B′ extends entirely across the upper end of the side or screen D, by which arrangement the passing coal is distributed over the entire width of D, and has to pass its entire length, thus insuring a thorough screening of the coal. The construction and location of this hopper B B′ make it a success in receiving the contents of the bucket by which the coal is hoisted from the hold of the vessel, a result which I believe was never before accomplished by any hopper.

By placing the reservoir O in its peculiar position, and making it large, several advantages are obtained. Among others, a large screening surface is obtained. The gate *h* is sufficiently high from the wharf to allow vehicles to be placed so as to receive the coal direct as it is discharged from the chute, so as to save reloading it from the wharf; and the reservoir O is large enough to serve as a store-room, so that, in case of temporary delay in the vehicle carrying the coal to the yards, the work of unloading the ship or other vessel can proceed without the necessity of piling the coal upon the wharf.

When it is not desired to screen the article or substance to be unloaded, a false bottom or metal blank, K, is placed upon the grating or inclined side D of the reservoir, so that the substance will be carried directly through the chute into the cart or wagon intended to convey it away.

The gate or cut-off which I use consists of a lever-bar, *p*, which has one end pivoted to the frame, so that it will extend transversely across above the end of the chute. Metal teeth *h* extend downward across the mouth of the chute, so as to bar the entrance. When the cart is in position beneath the chute, the free end of the lever is raised so as to clear the teeth from the mouth of the chute, and allow the substance to pass through by its gravity into the cart.

From the practical success which has attended my invention, I believe its introduction will make it profitable to ship other substances, such as cobble-stones, gravel, &c., and assort them while unloading the ship.

By this arrangement coal can be discharged from ships, screened, and loaded into carts not only at a great saving of expense in handling it, but with less wastage, as the large and more marketable pieces or lumps will not be broken when dumped in this machine, as they always are to a greater or less extent when dumped from the height of twenty or thirty feet upon the wharf or coal-pile.

Having described my invention, what I claim, and desire to secure by Letters Patent, is—

1. A portable combined coal receiving, screening, and delivering apparatus arranged to receive the coal or other cargo from a swinging suspended tub or bucket, by which it is hoisted from the hold of a ship or other water-craft, and to screen it automatically and deliver it into carts, said apparatus being constructed and arranged substantially as described.

2. The receiving-hopper B B′, in combination with the reservoir O, with its screen or grating side D, chute F, with its toothed gate *h*, and one or more independent screens, I, all combined and arranged substantially as and for the purpose above described.

3. The metal blank or false bottom K, in combination with the receiving-hopper B B′, reservoir O, chute F, and gate *h*, substantially as and for the purpose above described.

4. The combination of the hopper B B′, for receiving the coal from a swinging bucket, the reservoir O, arranged to receive the coal as it passes from the hopper, with the chute F and gate *h*, all constructed to operate substantially as and for the purpose set forth.

5. In combination with the elongated hopper, the screen D, reservoir O, and chute F, with its gate *h*, the combination being substantially as is herein set forth.

MARTIN R. ROBERTS.

Witnesses:
J. L. BOONE,
CHAS. G. PAGE.